United States Patent [19]

Fujiwara et al.

[11] 4,277,572

[45] Jul. 7, 1981

[54] GALVANIC CELL SEPARATOR

[75] Inventors: Kunihiko Fujiwara; Kazuya Osawa, both of Yokohama; Yoshiteru Takeda, Tokyo; Toshiaki Yabumoto, Yokohama, all of Japan

[73] Assignees: The Furukawa Electric Company, Ltd., Tokyo; The Furukawa Battery Co., Yokohama, both of Japan

[21] Appl. No.: 66,062

[22] Filed: Aug. 13, 1979

Related U.S. Application Data

[62] Division of Ser. No. 911,529, Jun. 1, 1978, abandoned.

[30] Foreign Application Priority Data

Jun. 3, 1977 [JP] Japan .................................. 52/65582
Feb. 24, 1978 [JP] Japan .................................. 53/19746
Mar. 7, 1978 [JP] Japan .................................. 53/24945

[51] Int. Cl.$^3$ .............................................. C08F 8/06
[52] U.S. Cl. ................................ 525/61; 260/33.4 R; 429/247; 429/249; 429/204
[58] Field of Search .......................................... 525/61

[56] References Cited

U.S. PATENT DOCUMENTS 3,518,242  6/1970  Chrisp ................................... 525/61

OTHER PUBLICATIONS

Poly(Vinyl Alcohol), Pritchard, J. G., pp. 44, 45, 85, 105, 109 (1970).

Primary Examiner—Stanford M. Levin
Attorney, Agent, or Firm—Bacon & Thomas

[57] ABSTRACT

A galvanic cell separator composed of polyvinyl alcohol having a crystallinity of 0.4 or more to be used with a galvanic cell containing alkaline electrolyte, and a method of manufacturing the same.

5 Claims, No Drawings

GALVANIC CELL SEPARATOR

This is a division, of application Ser. No. 911,529, filed June 1, 1978, abandoned.

This invention relates to a separator for use with a galvanic cell containing alkaline electrolyte such as a nickel-cadmium cell, nickel-zinc cell, nickel-iron cell and silver-zinc cell. A galvanic cell separator proposed to date includes a cellulose cell separator, micro-porous polyolefin cell separator and cross-linked polyvinyl alcohol cell separator. However, there has not yet been developed a galvanic cell separator which has a sufficiently high chemical durability to resist the action of a high temperature alkali solution and yet a low electric resistance. The prior art cellulose cell separator is easily dissolved in a hot alkali solution, particularly when said solution contains such ingredient as readily oxidizes the cellulose. The micro-porous polyolefin cell separator has a low thermal resistance and indicates an increase with time in electric resistance. A polyvinyl alcohol cell separator hitherto proposed was found to have a crystallinity ranging approximately between 0.3 and 0.35, and too low a chemical durability for practical application.

For elimination of the drawbacks of said polyvinyl alcohol cell separator, another type of polyvinyl alcohol cell separator has been proposed which is cross-linked by formaldehyde or boric acid. However, this proposed polyvinyl alcohol cell separator had a high electric resistance and reduced cell voltage.

This invention has been accomplished in view of the above-mentioned circumstances, and is intended to provide a galvanic cell separator having a low electric resistance and a high chemical durability. A galvanic cell separator embodying this invention is composed of polyvinyl alcohol having a crystallinity of 0.4 or more. It has been proved that the resistance of polyvinyl alcohol to alkali and oxidation depends on the crystallinity of said polyvinyl alcohol. Table 1 below sets forth the results of testing the resistance to alkali and oxidation of polyvinyl alcohol having different degrees of crystallinity.

TABLE 1

| Crystallinity of polyvinyl alcohol | | Weight loss (%) after exposed to alkali or oxidation | |
|---|---|---|---|
| | | Test for alkali resistance | Test for oxidation resistance |
| Present invention | 0.43 | 1.2 | 68.4 |
| | 0.52 | 0.0 | 20.0 |
| | 0.55 | 0.0 | 14.2 |
| Prior art | 0.33 | 6.7 | Dissolved |

A test piece of polyvinyl alcohol 50 microns thick was tested for alkali resistance by being dipped one hour at 100° C. in an aqueous solution containing 475 g/l of potassium hydroxide and 13 g/l of lithium hydroxide. The weight loss of said test piece is indicated in % by weight in Table 1 above. Another test piece of polyvinyl alcohol similarly 50 microns thick was tested for oxidation resistance by being dipped two hours at 80° C. in an aqueous solution containing 475 g/l of potassium hydroxide, 13 g/l of a lithium hydroxide and 50 g/l of potassium persulfate. The weight loss of said another tested piece is indicated in Table 1 above. These tests proved that polyvinyl alcohol having a crystallinity of 0.4 or more had a sufficiently high chemical durability to be used as a galvanic cell separator.

As defined in "Kobunshi Kagaku" (Polymer Chemistry), Vol. 12, p. 506, 1955, the term "crystallinity" means a value calculated from the following equation:

$$\frac{1}{\rho} = \frac{x}{1.345} + \frac{1-x}{1.269}$$

(where $\rho$ is the density of a sample and x is the crystallinity thereof) with the density of polyvinyl alcohol in a crystalline region taken to be 1.345 and the density thereof in an amorphous region taken to be 1.269, $\rho$ can be easily measured by a density gradient tube. A crystallinity of 0.5 or more provides a higher chemical durability. However, a high crystallinity over 0.6 tends to render polyvinyl alcohol noticeably brittle. Therefore, polyvinyl alcohol used as a galvanic cell separator is most preferred to have a crystallinity ranging between 0.5 and 0.6.

Cross-linking of polyvinyl alcohol for promotion of its chemical durability results in an increase in the electric resistance of said polyvinyl alcohol, whereas elevation of the crystallinity of said polyvinyl alcohol for the same object gives rise to little increase in electric resistance. A polyvinyl alcohol film 50 microns thick (having a crystallinity of 0.33) which was not treated for cross-linking or elevation of crystallinity indicated an electric resistance of 0.4 mΩ dm$^2$ in a 7.2 N aqueous solution of potassium hydroxide at 35° C. A polyvinyl alcohol film cross-linked by formaldehyde solution had an electric resistance of 12 mΩ dm$^2$. Another film of high crystallinity polyvinyl alcohol embodying this invention showed an electric resistance of 1.6 mΩdm$^2$. This degree of electric resistance can be allowed for the present galvanic cell which has prominent chemical durability such as resistance to alkali and oxidation.

A high crystallinity polyvinyl alcohol can be prepared by heating. For instance, a polyvinyl alcohol has a crystallinity of 0.52, when heated 10 minutes at 200° and a crystallinity of 0.43 when heated 60 minutes at 140° C. in the air. However, a polyvinyl alcohol heated in the air has low flexibility, and should preferably be subjected to softening treatment before practically applied. Such little flexible polyvinyl alcohol can be softened by being dipped in a hygroscopic polyhydric alcohol solution such as glycerin and ethylene glycol. It has further been found that a flexible high crystallinity polyvinyl alcohol can be prepared by heating a low crystallinity polyvinyl alcohol in a non-oxidizing atmosphere. A non-oxidizing atmosphere means an atmosphere free from oxygen or a highly oxidizing compound, for example, an atmosphere of nitrogen, argon, helium, hydrogen or carbon dioxide which does not react with polyvinyl alcohol at a lower temperature than 240° C. Further, vacuum or condition of reduced pressure can be applied as a sort of non-oxidizing atmosphere. For instance, where air is drawn off from a heat-resistant bag containing a polyvinyl alcohol film, and thereafter, the inlet of the bag is sealed, then heating can be effected in a non-oxidizing atmosphere. Heating temperature is preferred to range between 130° and 240° C. Short heating at a lower temperature than 130° C. does not appreciably elevate the resistance of a polyvinyl alcohol to alkali and oxidation. Application of a higher temperature than 240° C. tends to result in the decomposition of a polyvinyl alcohol. Table 2 below shows that heating in a non-oxidizing atmosphere provides a flexible galvanic cell separator of high elongation. A galvanic cell separator improved in mechanical properties enables a galvanic cell to be easily assembled, and does not give rise to a defect such as cracks in the folded portion, thereby ensuring the reliable application of a galvanic cell.

TABLE 2

| Heating condition | Elongation (%) |
| --- | --- |
| 70 minutes at 185° C. in an atmosphere of nitrogen | 180 |
| 70 minutes at 185° C. in the air | 25 |

A galvanic cell separator embodying this invention is applied to separate the positive and negative electrodes or auxiliary electrodes of a galvanic cell from each other. To this end, the present galvanic cell separator may preferably be used in the form of a film or sheet, and most preferably be used in a film 10 to 100 microns thick. A galvanic cell separator composed of a polyvinyl alcohol film substantially having a crystallinity of 0.4 or more is included in the scope of this invention. A preferred type of galvanic cell separator is a polyvinyl alcohol film filled with fibrous or fabric material for reinforcement or laminated with a sheet of fibrous, fabric or filmy material. For the object of this invention, it is possible to use a polyvinyl alcohol film in which powders such as metal oxide are dispersed.

The galvanic cell separator of the invention is preferably used after the surface is chemically treated. Following is the reason. A polyvinyl alcohol having a crystallinity of 0.4 or more tends to have a hydrophobic surface and easily attracts air bubbles remaining in the electrolyte of a galvanic cell. Deposition of air bubbles on said surface leads to an increase in the internal electric resistance of the galvanic cell and in consequence a decline in its voltage. It has been proved that this drawback can be eliminated by treating the surface of a polyvinyl alcohol separator with an aqueous solution of permanganate. This treatment renders the surface of a polyvinyl alcohol hydrophilic, thereby suppressing deposition of air bubbles on the surface and minimizing polarization.

Permanganate usable for the object of this invention is at least one selected from the group consisting of water-soluble permanganates such as sodium permanganate, potassium permanganate, lithium permanganate, rubidium permanganate, barium permanganate, zinc permanganate and calcium permanganate. It is possible to use an aqueous solution of permanganate whose concentration ranges between 0.001 gram equivalent/l and saturation. However, the preferred concentration of the permanganate ranges from 0.05 gram equivalent/l to saturation. An aqueous solution of permanganate is available for use, regardless of whether it is of a neutral, alkaline or acid type. An acid aqueous solution of permanganate may be used, though a polyvinyl alcohol film is partly dissolved in said solution. A neutral or alkaline aqueous solution of permanganate is optimum for surface treatment.

Surface treating temperature is not a very important factor with respect to the effect of treatment. It is generally advised to treat the surface of a polyvinyl alcohol at 10° to 60° C. The surface treatment is carried out for a sufficient length of time to render the surface of a polyvinyl alcohol hydrophilic. A highly concentrated aqueous solution of permanganate immediately finishes the surface treatment. A low concentrated aqueous solution of permanganate completes the surface treatment in a relatively long time. Usually the surface treatment can be finished in several seconds or minutes. The hydrophilic condition of the surface of a polyvinyl alcohol can be determined from the extent to which air bubbles remaining in the aqueous solution of potassium hydroxide settle on the surface of polyvinyl alcohol. The surface treatment can be effected by bringing the surface of a polyvinyl alcohol into contact with the above-mentioned aqueous permanganate solution, for example, by means of coating or dipping.

This invention will be more fully understood by reference to the examples which follow.

EXAMPLE 1

A polyvinyl alcohol film 50 microns thick having a crystallinity of 0.33 was heated in the air one hour at 180° C. to provide a galvanic cell separator embodying this invention whose crystallinity was 0.55. The film was softened by dipping in a solution containing 20% by weight of glycerin. When dried, the film provided a galvanic cell separator embodying this invention. Eight nickel oxide electrode plates each measuring 55 mm×95 mm were specially formed. Eight porous zinc electrode plates each similarly measuring 55 mm×95 mm were placed in the respective intervening spaces between the nickel oxide electrode plates, thus alternately arranging the positive and negative electrodes. The respective electrode plates were wrapped in the above-mentioned separator. Electrode plates of the same kind were electrically connected in parallel, thereby assembling a nickel-zinc cell having a capacity of 10 AH.

For comparison, a similar nickel-zinc cell was constructed as a control sample by wrapping the positive and negative electrode plates in the known polyvinyl alcohol film 50 microns thick having a crystallinity of 0.33. Another nickel-zinc cell was built similarly as a control sample by wrapping the positive and negative electrode plates in the conventional polyvinyl alcohol film 50 microns thick crosslinked by formaldehyde solution. An electrolyte of an aqueous solution containing 475 g/l of potassium hydroxide, 13 g/l of lithium hydroxide and 40 g/l of zinc oxide was poured into the above-mentioned cells. Charge-discharge tests were made of said cells, the results being set forth in Table 3 below.

TABLE 3

| | Cell separator | Average cell voltage (volts) | Cycle life (cycles) |
| --- | --- | --- | --- |
| This invention | Polyvinyl alcohol film having a crystallinity of 0.55 | 1.52 | Over 160 |
| Prior art | Polyvinyl alcohol film having a crystallinity of 0.33 | 1.52 | 43 |
| | Polyvinyl alcohol film crosslinked by formaldehyde | 1.37 | 96 |

EXAMPLE 2

A polyvinyl alcohol film 50 microns thick having a crystallinity of 0.33 was heated 10 minutes in an atmosphere of nitrogen at 200° C. to provide a galvanic cell separator embodying this invention whose crystallinity was 0.51. Nickel oxide electrode plates and cadmium electrode plates were wrapped in the above-mentioned high crystallinity polyvinyl alcohol film to construct a nickel-cadmium cell. This cell separator was flexible and had an elongation of 164%, enabling the cell to be easily assembled. An electrolyte of an aqueous solution containing 15 g/l of lithium hydroxide and potassium hydroxide having a density of 1.22 was poured into the above-mentioned nickel-cadmium cell. Charge-discharge tests were made of the nickel-cadmium cell, at the five-hour rate. This cell did not indicate any abnormality even when charge and discharge were repeated 300 times.

Another galvanic cell separator embodying this invention was prepared by heating a polyvinyl alcohol film 50 microns thick 10 minutes at 200° C. in the air. This separator had as low an elongation as 39%, though the crystallinity was 0.51. This proves that a galvanic cell separator composed of a polyvinyl alcohol film heated in a non-oxidizing atmosphere of nitrogen was prominently improved in respect of mechanical properties.

EXAMPLE 3

A polyvinyl alcohol film 25 microns thick having a crystallinity of 0.33 was heated 60 minutes in an atmosphere of argon at 190° C. whose crystallinity was 0.58. This cell separator was used to wrap the zinc electrode plates, thereby constructing a nickel-zinc cell. In this case eight porous zinc electrode plates were each wrapped in three times of said separator. These zinc electrode plates were spatially arranged, and eight nickel oxide electrodes were placed in the intervening spaces between the zinc electrode plates, thus alternately arranging the positive and negative electrodes. Electrode plates of the same kind were electrically connected in parallel.

An electrolyte of an aqueous solution containing 475 g/l of potassium hydroxide, 13 g/l of lithium hydroxide and 40 g/l of zinc oxide was poured into the above-mentioned nickel-zinc cell. Charge-discharge tests were made of this cell at the rate of two-hour rate. The cell withstood 300 charge-discharge cycles.

For comparison, charge-discharge tests were made of a control sample of nickel-zinc cell which was constructed by wrapping the zinc electrodes in a cell separator 35 microns thick which was formed of cellulosic material (manufactured by E. I. Du Pont de Numours & Co. Inc. under the trademark "PUDO No. 134") to build a nickel-zinc cell. Charge-discharge tests were repeatedly made of said control sample of nickel-zinc cell, which, however, was short-circuited at the 84th charge-discharge cycle, failing to be charged and discharged any longer.

EXAMPLE 4

A polyvinyl alcohol film 50 microns thick having a crystalinity of 0.33 was heated to 60 minutes at 180° C. in the air to provide a cell separator embodying this invention whose crystallinity was 0.55. The film was dipped 5 minutes at room temperature in an aqueous solution containing 0.05 mol/l of potassium permanganate and 2 mol/l of potassium hydroxide, followed by water washing and drying. Thus, the surface of the film was rendered hydrophilic. A galvanic cell was constructed in the same manner as in Example 1, using the above-mentioned cell-separator. Another galvanic cell was constructed in the same manner as above, using a cell separator which embodied this invention, but whose surface was not treated with an aqueous solution of permanganate. The above-mentioned two cells were discharged by 10 A current, until the cell voltage fell to 1.2 V. During the discharge, the former cell indicated an average voltage of 1.50 V, while the latter cell showed an average voltage of 1.41 V. This means that treatment of the surface of a polyvinyl alcohol film with an aqueous solution of permanganate provides a galvanic cell whose internal electric resistance is more decreased.

EXAMPLE 5

A polyvinyl alcohol film 50 microns thick having a crystallinity of 0.33 was heated 60 minutes in an atmosphere of nitrogen at 180° C. The heated polyvinyl alcohol film having a crystallinity of 0.53 was dipped 2 minutes for surface treatment in an alkaline aqueous solution at 25° C. containing 0.1 mol/l of potassium permanganate and 0.1 mol/l of potassium hydroxide, followed by water washing and drying, thereby providing a galvanic cell separator. A nickel-cadmium cell was constructed by applying said separator. Another nickel-cadmium cell was built by using a cell separator prepared from a polyvinyl alcohol film which was heated 60 minutes at 180° C. in the air according to this invention, but whose surface was not chemically treated. Both cells had a capacity of 10AH. When discharged by 2 A current, the former cell showed an average voltage of 1.25 V, while the latter cell indicated an average voltage of 1.71 V. This proves that a cell separator whose surface was treated with an aqueous solution of permanganate to be rendered hydrophilic enabled a galvanic cell to generate higher voltage. Both cells had a longer life than 300 cycles. Accordingly, the cell separator whose surface was treated with an aqueous solution of permanganate did not harmfully affect the cycle life.

What we claim is:
1. A method for manufacturing a galvanic cell separator which comprises the steps of
  (a) heating a polyvinyl alcohol film until the polyvinyl alcohol has a crystallinity of at least 0.4 and subsequently
  (b) contacting the surface of said polyvinyl alcohol film with an aqueous solution of permanganate.
2. The method as defined in claim 1 wherein in step (a) the polyvinyl alcohol film is treated until the polyvinyl alcohol has a crystallinity ranging from 0.5 to 0.6.
3. The method as defined in claim 1 wherein in step (a) the heating is carried in a non-oxidizing atmosphere.
4. The method as defined in claim 1 wherein in step (a) the heating is carried out at a temperature of from 130° to 240° C.
5. The method as defined in claim 1 wherein in step (b) the concentration of permanganate in the aqueous solution of permanganate ranges from 0.001 gram equivalent per liter to saturation concentration.

* * * * *